United States Patent [19]
Whitehouse et al.

[11] 3,896,396
[45] July 22, 1975

[54] LASER POWER SUPPLY

[75] Inventors: David R. Whitehouse, Weston;
David W. Hartshorn, Framingham, both of Mass.

[73] Assignee: Raytheon Company, Lexington, Mass.

[22] Filed: May 14, 1973

[21] Appl. No.: 359,827

[52] U.S. Cl. ............ 331/94.5 PE; 330/4.3; 315/137; 315/194; 315/199; 315/241 R; 315/241 P
[51] Int. Cl. .............................................. H01s 3/09
[58] Field of Search .................... 331/94.5; 330/4.3; 315/137, 194, 199, 241 R, 241 P

[56] References Cited
UNITED STATES PATENTS
3,451,010  6/1969  Maiman ........................ 331/94.5 P
3,771,017  11/1973  Switsen ......................... 315/241 R
3,772,613  11/1973  Smith ............................ 331/94.5 PE

*Primary Examiner*—Robert J. Webster
*Attorney, Agent, or Firm*—John R. Inge; Joseph D. Pannone; Milton D. Bartlett

[57] ABSTRACT

A method of energizing a laser source stimulating flash lamp directly from an AC power line. Uncontrolled diodes couple the anode and cathode of the flash lamp directly to the AC line. The lamp is triggered by a separate triggering circuit which produces its trigger pulse at a predetermined phase of the AC power source. The use of high current carrying controlled rectifiers and large energy storage devices is thereby eliminated.

11 Claims, 12 Drawing Figures

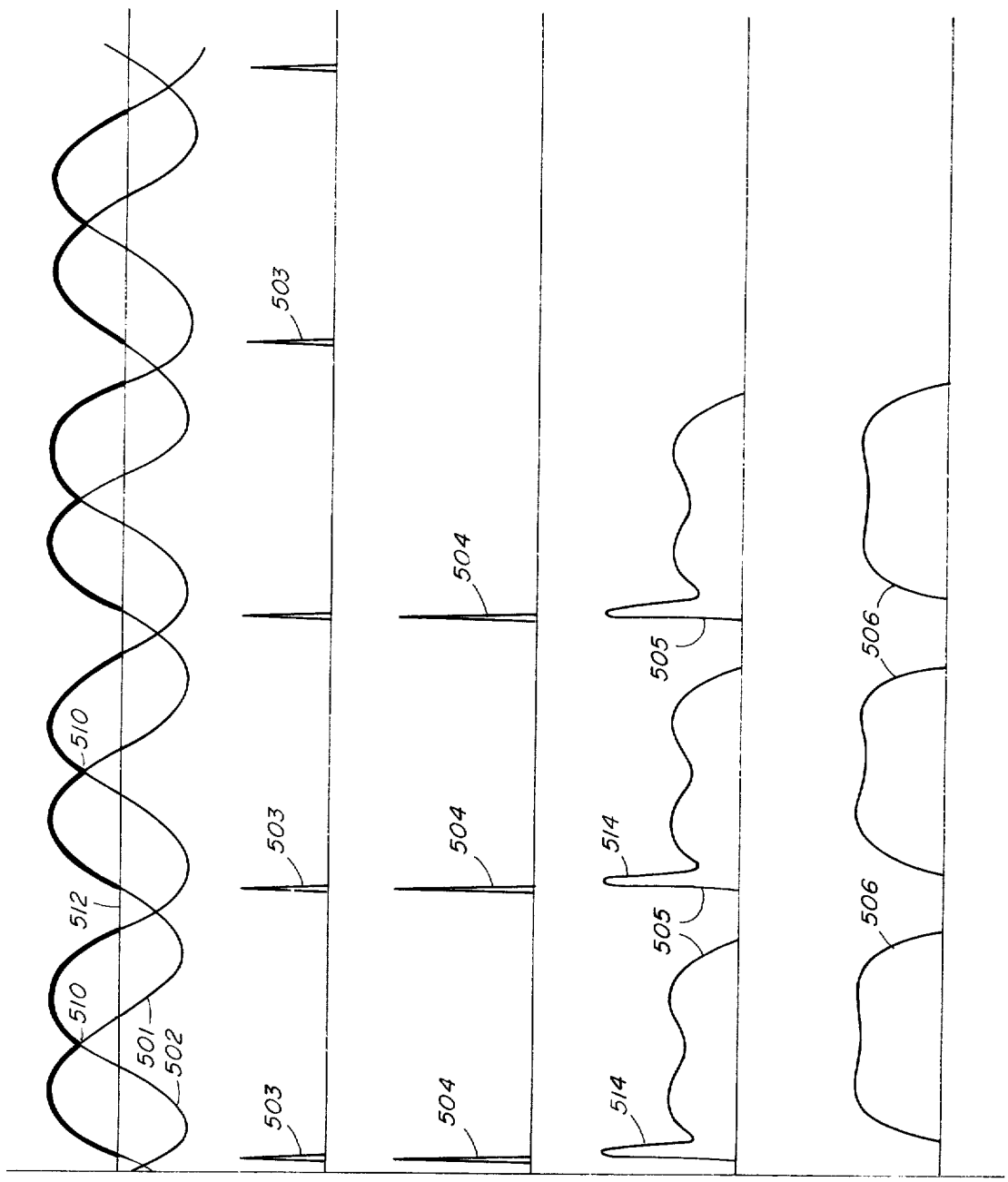

LASER POWER SUPPLY

BACKGROUND OF THE INVENTION

Producing sufficient light to excite a laser source used in welding and drilling applications has long been a problem. Initial attempts included those where large energy storage devices such as capacitors and inductors were charged for periods of time long in comparison to typical AC line frequencies then, when fully charged, were switched across the flash lamp. These energy storage devices tended to be both bulky and expensive and moreover the maximum rate at which the laser could be fired was low in that the time required to bring them to their peak storage capabilities from a rectified power line source is long compared with desirable welding pulse rates. Later attempts included coupling the flash lamp to an AC line source through controlled rectifiers. These later attempts required large, expensive, controlled rectifiers to implement any scheme in which enough power was transferred from the power line to the flash lamp. The prior art has not shown methods of coupling a flash lamp to an AC power source through simple uncontrolled rectifier means.

SUMMARY OF THE INVENTION

It is thus an object of the present invention to power a flash lamp without the use of large energy storage devices.

It is also an object of the present invention to fire a flash lamp from an AC power source without the use of controlled rectifiers.

Furthermore, it is an object of the present invention to fire a flash lamp from an AC power source at an arbitrary phase angle of the power source without the use of controlled rectifiers in the high current carrying portions of the circuitry.

Moreover, it is an object of the present invention to fire a flash lamp from an AC power source for a longer period of time than a single half cycle of the AC power source.

These objectives, as well as others of the present invention, may be met by providing the combination of rectifying means for coupling one or more radiation producing means to a source of alternating power wherein the radiation producing means operates starting from the application of a trigger signal, and means for producing the trigger signal at a predetermined phase angle of the alternating power source. In the preferred embodiment, the radiation producing means comprises means for producing light from the ionization of the gas, such as may be done with a xenon flash lamp. Also, in the preferred embodiment, the rectifying means comprises semiconductor diodes. The means for producing the trigger signal in the preferred embodiment includes means for sensing the phase of the alternating power source and generating the trigger signal at that predetermined phase.

In order to operate the lamp for more than the time period of a single half cycle of any phase of the power source, the rectifying means may couple the lamp to a source of power having a plurality of phases such that the ionization is sustained continuously for a period of time longer than any half cycle of the power source. Since two adjacent half cycles overlap one another in the usual sinusoidal power source having three or more phases connected in either a Y or delta arrangement, the current through the lamp and, hence, light output is sustained during the time period occupied by both of these half cycles. The time during which the third phase in a three-phase system would overlap the other two phases is used for recovery time for the lamp. In the preferred embodiment means is included for initiating the ionization at a predetermined time. This initiation of ionization may be accomplished by impressing a pulse of sufficiently high voltage to break down the gas in the lamp. The pulse may be coupled to the lamp in either of two ways. In the first method an external triggering electrode is provided near the anode and cathode between which the main current is carried. When the high voltage pulse is applied to the triggering electrode, the gas will tend to break down and ionize between the anode and cathode electrodes. Secondly, the high voltage pulse may be applied directly between the anode and cathode wherein the gas breakdown path will align directly between those two electrodes. In some embodiments, means is provided for applying a predetermined number of the pulses to the light producing means. Included in the means for applying the predetermined number of pulses is the combination of means for counting the number of pulses and switch means coupling the pulses to the light producing means in response to the output of the counting means. Conventional digital logic may be used for the counting means.

Furthermore, the objectives of the present invention may be met by providing the combination of means for producing laser light, noncoherent light producing means for stimulating the laser light producing means wherein the noncoherent light producing means produces the noncoherent light in response to an electrical current through the device, and uncontrolled rectifying means coupling the noncoherent light producing source to a source of alternating electrical power. The laser light producing means in preferred embodiments may comprise a ruby rod, a glass rod doped with neodymium, or YAG (yttrium-aluminum-garnet), according to well-known techniques of the laser art. A xenon flash lamp is used in one embodiment for the noncoherent light producing means. This xenon flash lamp may be formed in the shape of a rod where it is disposed in a partially enclosed mirrored surface with the laser light producing means. The flash lamp may alternatively be formed in the shape of a helix with the laser light producing means located along the central axis of the helix. Again, the alternating source of electrical power may have a plurality of phases. Current is conducted through the noncoherent light producing means only during adjacent-like polarity half cycles of the power source. The above combination may further include means for initiating the current through the noncoherent light producing means at a predetermined phase angle of one of the phases of the source of alternating electrical power.

BRIEF DESCRIPTION OF THE DRAWINGS

FIGS. 5A through 5E are a series of waveforms useful in explaining the operation of the present invention as described in the embodiment of FIG. 3;

DESCRIPTION OF THE PREFERRED EMBODIMENT

Figure 1:
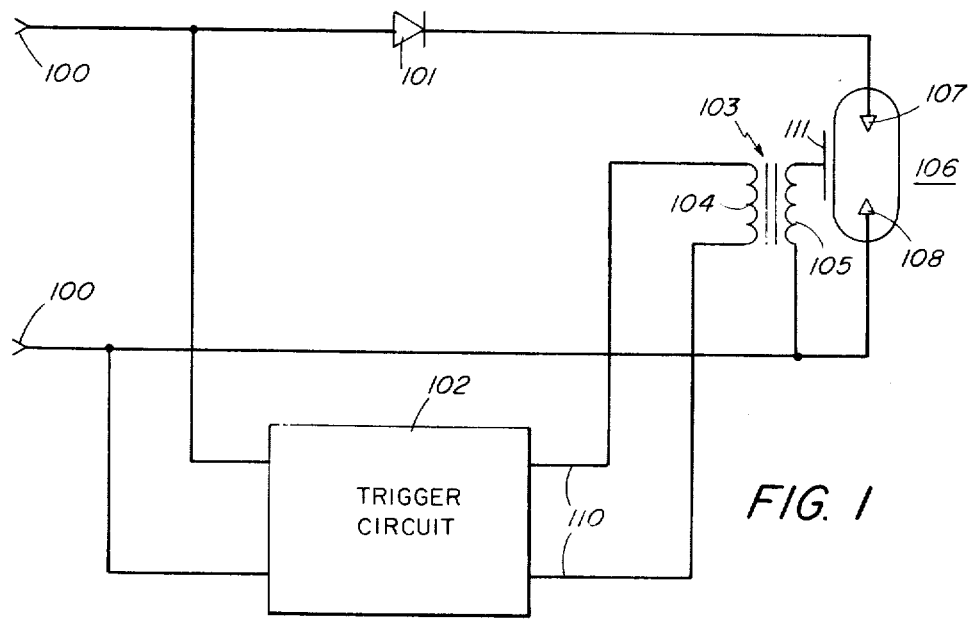
FIG. 1 is a simplified circuit diagram showing therein a flash lamp excited from an AC power line, in accordance with the present invention.
Figure 4:
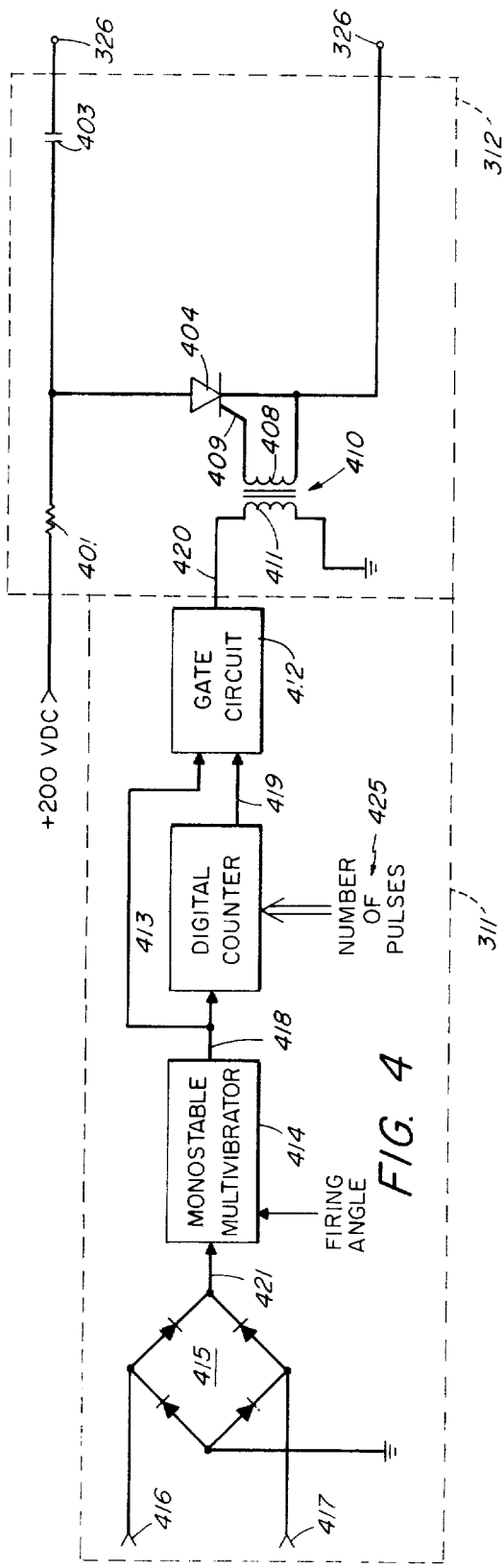
FIG. 4 is a circuit diagram of the trigger circuitry shown in the circuit of FIG. 3.

In the circuit of FIG. 1 the anode 107 of the flash lamp 106, which is preferably a xenon flash lamp, is coupled to one terminal of the single phase AC power line 100 through diode 101. The frequency of the AC line may be the conventional 50 or 60 cycles per second. The cathode 108 of the flash lamp 106 is coupled directly to the other terminal of the AC power line 100. With this connection, the flash lamp, once excited, will emit light and conduct only during the positive half cycles of the single phase AC power source. During the negative half cycles, no light will be emitted and no current will exist in the lamp. The input of the trigger circuit 102 is connected to the same AC power source 100 so that the circuit may sense the phase of the source. The trigger circuit 102, one embodiment of which will be discussed in conjunction with FIG. 4, provides a triggering pulse to the flash lamp 106 at a predetermined phase angle of the AC power source 100 which thereby triggers the flash tube 106 through an external trigger electrode 111. Since the trigger electrode 111 is controllably switched rather than the power input to the cathode and anode, it becomes unnecessary to use controlled rectifier means in the high power carrying anode and cathode leads of the flash lamp 106. The output trigger pulse from the trigger circuit 102 is coupled on lines 110 to the primary 104 of triggering transformer 103. The secondary 105 of this transformer is connected between the cathode 108 and the trigger electrode 111. The transformer 103 is used to increase the triggering pulse voltage to a sufficient level so as to initiate the gas breakdown in the flash lamp 106 between the anode 107 and cathode 108. After the triggering pulse has been applied, while the voltage applied between the cathode 108 and anode 107 from the power line 100 through diode 101 is sufficiently high, the gas breakdown and light output will continue without the presence of the triggering pulse. The light output will be extinguished when the voltage applied between anode 107 and cathode 108 falls below that voltage needed to sustain the gas breakdown. Of course, light output will not be produced during the negative half cycle of the AC power source 100.

Figure 2:
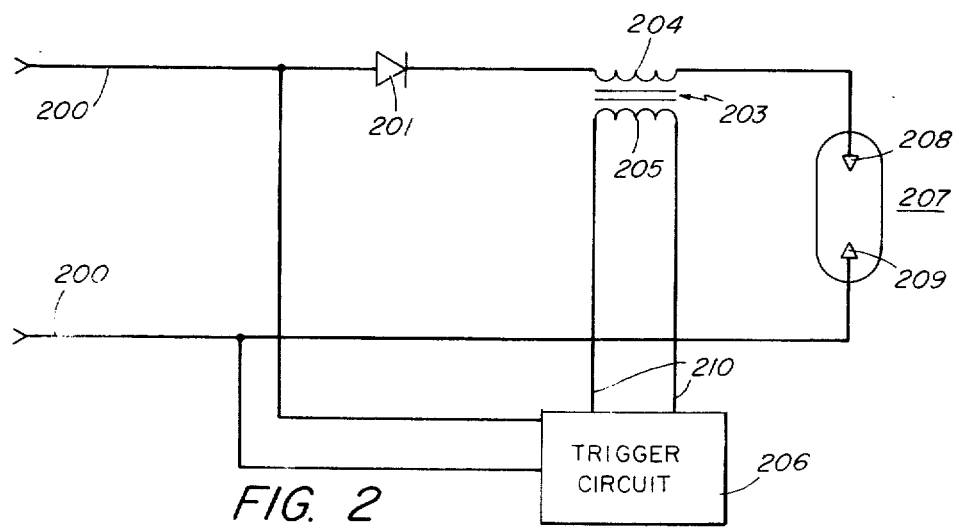
FIG. 2 is a simplified circuit diagram showing an alternative method of exciting the flash lamp in accordance with the present invention.

In FIG. 2 there is illustrated an alternative method for triggering the flash lamp. This circuit is similar to FIG. 1 except that it utilizes series injection triggering through transformer 203 to initiate ionization of the flash lamp 207. As in the previous circuit, a diode 201 couples the anode 208 of the flash lamp 207 to one terminal of the AC power source on lines 200. Here the discharge or gas breakdown is initiated by impressing a high voltage trigger pulse as an addition to the power line voltage rather than by coupling the pulse through a separate triggering electrode as was shown in FIG. 1. In this case, the gas breakdown path initiated by the triggering pulse lies directly between anode 208 and cathode 209 rather than through the intermediate triggering electrode 111 as in FIG. 1. The lamp triggering pulse produced by a triggering circuit 206 is coupled through lines 210 to the primary 205 of transformer 203. At the secondary 204 of the transformer 203, the transformer stepped-up trigger voltage is added to the AC line voltage. When the sum of the two reaches the breakdown voltage of the flash lamp 207, the gas discharge and light output will be initiated. Once the discharge begins, it will be sustained in the absence of the trigger pulse once the rectified AC line voltage is sufficiently high. This sustaining AC line voltage is less than the voltage necessary to initiate the discharge. The input of the triggering circuit 206 is coupled to the AC power source 200 so that it may sense the phase of the source and produce the triggering pulse at the desired phase angle.

Figure 3:
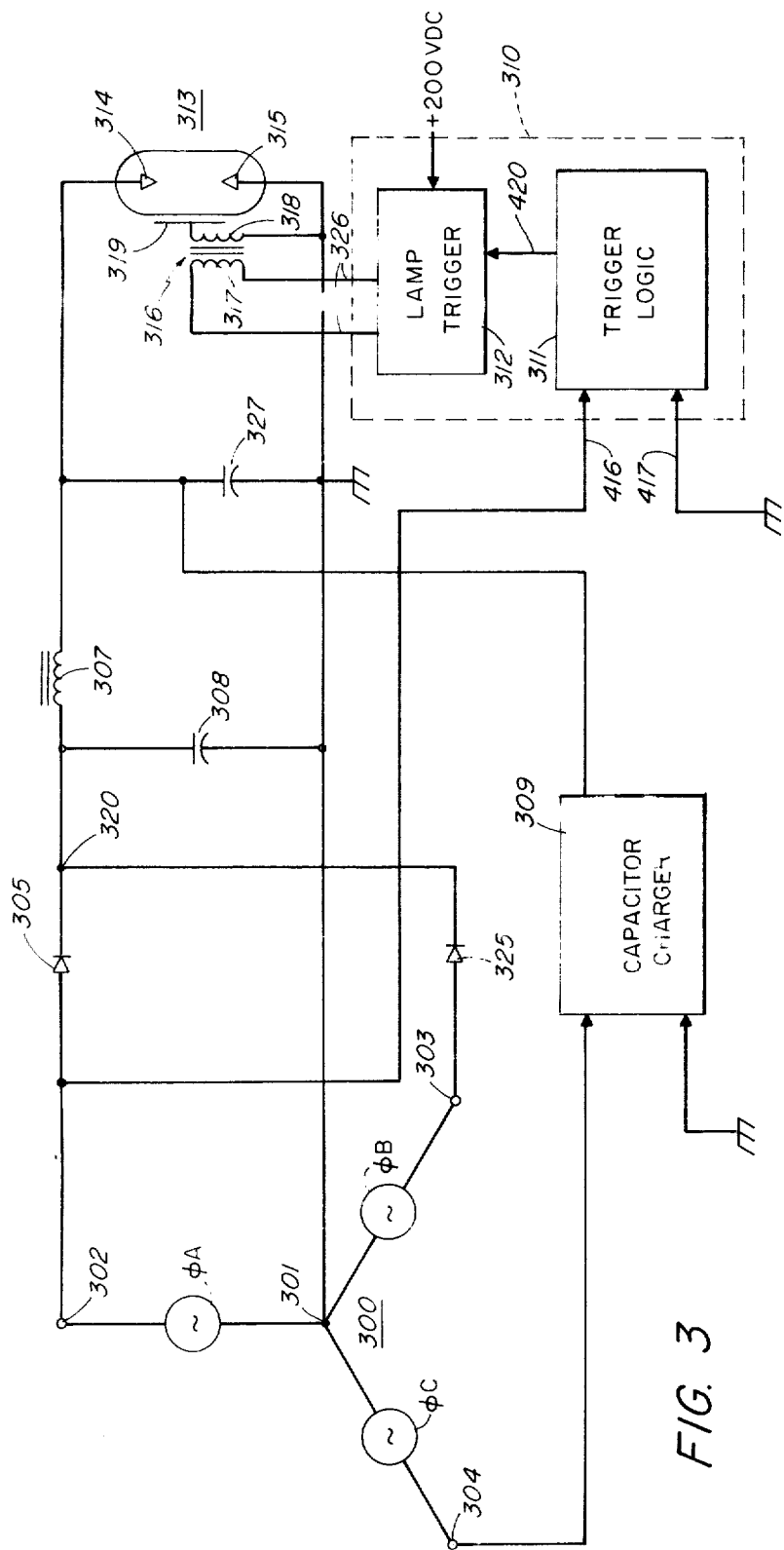
FIG. 3 is a circuit showing a flash lamp being excited from two phases of a three-phase Y-connected alternating current source.

In FIG. 3 there is shown the circuit diagram of a flash lamp circuit operating from a three-phase Y-connected AC power source in accordance with the teachings of the present invention using a half-wave rectifier. This figure will be discussed in conjunction with the waveforms shown in FIGS. 5A–5E. In FIG. 5A two of the phases of the three-phase AC power source are shown by curves 501 and 502, which represent $\phi A$ and $\phi B$ respectively. In the circuit of FIG. 3, curve 501, $\phi A$, is the voltage waveform between points 302 and 301 while the curve 502, $\phi B$, is the waveform between points 303 and 301, $\phi C$, not shown, lags $\phi B$ by 120°. Point 301 is the neutral or ground of the power source. Points 302 and 303 are coupled through diode 305 and 325 to common point 320. The voltage waveform between points 320 and ground as it would appear with no load is shown as the heavy black line in FIG. 5A. The voltage at point 320 is coupled through smoothing choke 307 to the anode 314 of the flash lamp 313. The center troughs of the rectified and summed portions of the waveform at point 320 are sufficiently high after being smoothed by choke 307 that the gas breakdown in the flash lamp 313 will not be ceased when the waveform passes through these points of low voltage. The neutral point 301 is coupled directly to the cathode 315 of the flash lamp 313. This method of using two of the three phases of the AC power source permits lengthening of the flash lamp pulses over that possible with a single phase system thereby producing a more desirably lengthened laser pulse waveform for laser welding applications. Furthermore, since the recovery time of most flash lamps, particularly xenon flash lamps, is typically no more than several hundred microseconds, the time between pulses using either a 50 or 60 cycle sinusoidal three-phase source will be more than sufficient for complete lamp recovery between firings.

Included in the circuit shown in FIG. 3 are the prepulse capacitor 308, aging capacitor 326 and the capacitor charger 309. While the flash lamp is in the recovery period, shown at 512 in FIG. 5A, the capacitors are charged to a DC voltage preferably in the range of 1.2 to 2.4 kilovolts from the capacitor charger 309. Charge will flow during this time into the capacitors 308 and 326 rather than the flash lamp 313 or power source 300 since the flash lamp 313 is at a high impedance when it is not being fired and the 1.2 to 2.4 kilovolts back biases diodes 305 and 325. When the flash lamp 313 is initially fired, the charge on the prepulse capacitor 308 and aging capacitor 326 will add to the initial current surge through the flash lamp 313 and will produce a high narrow current peak at the beginning of the firing of the lamp. The current flow from the prepulse capacitor 308 primarily initiates the arc inside the flash lamp 313 while aging capacitor 326 is primarily responsible for the spreading or "aging" of the arc throughout the flash lamp 313. These peaks 514 in FIG. 5D appear at the leading edges of the current pulses 505 which represent the current through the flash lamp 313, ensuring that there is an initial high peak of light out of the flash lamp 313 and into the laser. This high initial peak is desirable to ensure a fast rise time of the laser light output and that the lamp fires dependably. If this fast rise time of the laser light output were not present, the laser light would tend to be reflected off the surface being welded during the initial portions of the laser light pulses thereby reducing the efficiency of the welding operation. A fast rise time on the laser light output ensures that the surface of the material being welded will be initially broken by the laser and that the remainder of the pulse will be used to effectuate the weld rather than being reflected off the surface. In the preferred embodiment, the capacitor charger 309 is constructed using a transformer with a rectifying diode in the transformer secondary resistively coupled to the capacitor 308.

The flash tube triggering circuit 310 also may be used for the triggering circuits shown in FIGS. 1 and 2. The trigger logic 311 senses the alternating $\phi A$ voltage between points 302 and 301 and produces a relatively low voltage narrow pulse, for example, 12 volts with a width of one microsecond, at the desired phase angle. The lamp trigger circuit 312 converts the relatively low voltage input pulse from line 420 to a relatively high voltage pulse, such as two kilovolts, on lines 326 which is coupled to the primary 317 of triggering transformer 316. The secondary 318 of triggering transformer 316 is connected to the cathode 315 and triggering electrode 319. The trigger logic 311 also contains binary logic pulse counting circuitry which counts out the desired number of pulses firing the flash lamp with each pulse, then counts out a pause between bursts of pulses. In this particular illustration, the flash lamp 313 is fired at the beginning of the cycle of $\phi A$ although any other point of any phase could be used as well. Here, three pulses are counted out each burst. Then, after counting out a pause, the same burst of three pulses will be repeated.

Figure 6:
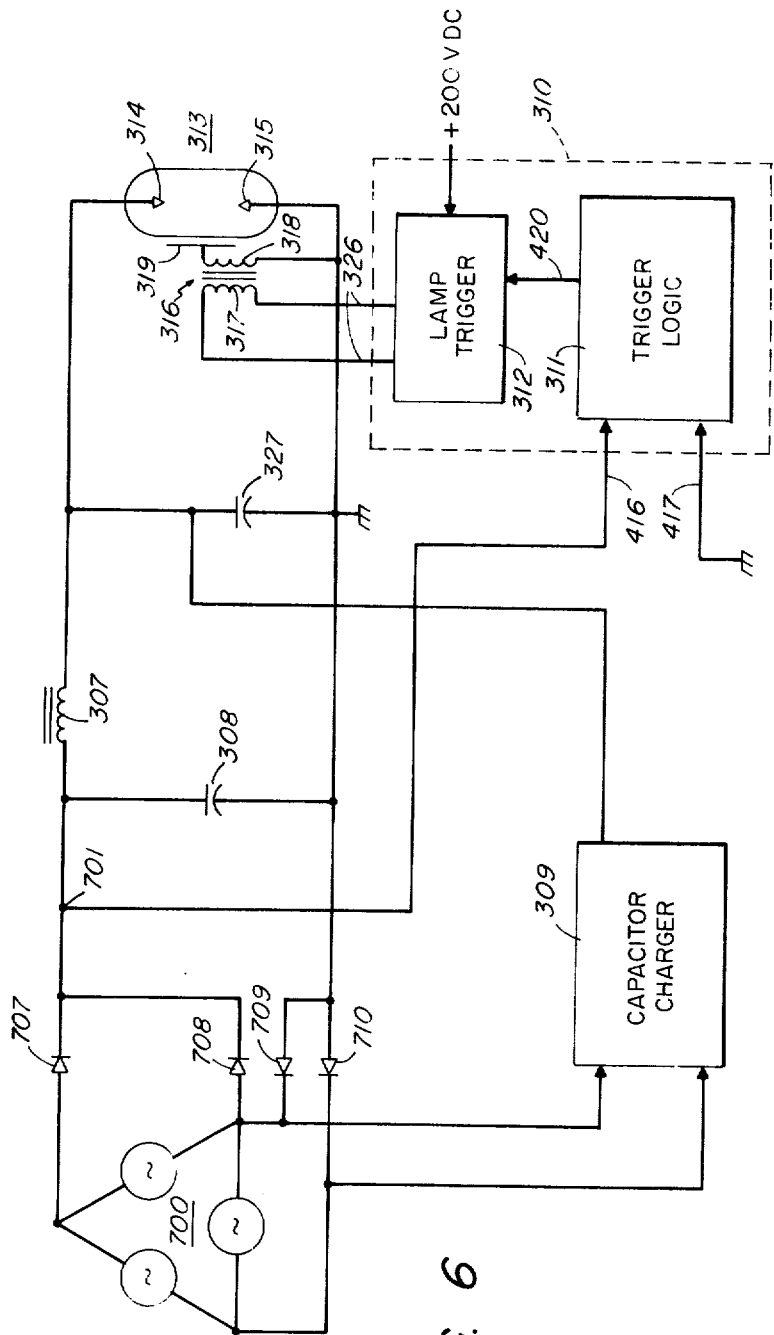
FIG. 6 is a circuit showing a flash lamp being excited from a three-phase delta-connected alternating power source.
Figure 7:
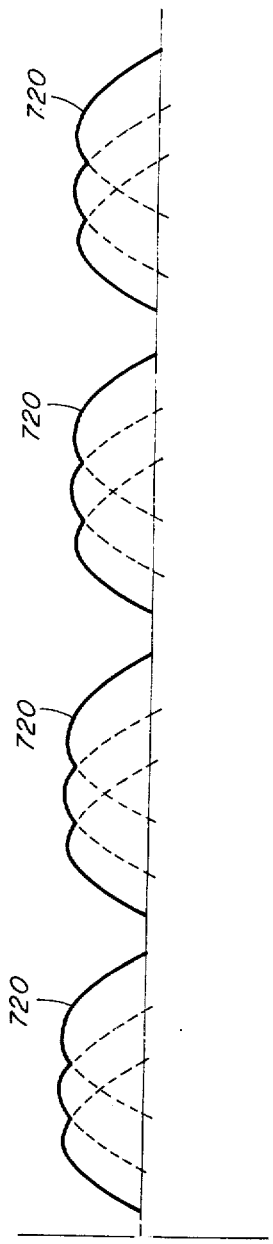
FIG. 7 is a waveform showing the rectified voltage in FIG. 6.

In the circuitry shown in FIG. 4, the trigger logic 311 employs a full wave diode bridge 415, the inputs 416 and 417 of which are connected to $\phi A$ on points 302 and 301 respectively, as in FIG. 3. The output of the full wave bridge 415 on point 421 is connected to the input of monostable multivibrator 414. This multivibrator 414 produces a pulse on line 418 at the phase angle of each cycle of $\phi A$ selected by the firing angle adjustment. These pulses on line 418 are shown as pulses 503 in FIG. 5B. The pulses on line 418 are coupled both to the input of digital counter 413 and to the input of gate circuit 412. The number of pulses in the burst of pulses is set on lines 425 from external switches. The digital counter 413 produces a logical 0 state output on line 419 whenever the desired number of pulses has been counted out by the counter 413. The gate circuit 412 comprises a binary logic AND gate which produces an output only when both of its inputs are in the logical 1 state. Since the peaks 503 represent the logical 1 state, the pulses will be allowed to pass through the AND gate 412 only when the output from digital counter 413 on line 419 is in the logical 1 state, indicating that the end of the count has not been reached. The pulses on line 420, which will be of the form as shown as pulses 504 in FIG. 5C, are coupled to the primary 411 of pulse transformer 410. The secondary winding 408 of transformer 410 is connected between the gate 409 and the cathode of the silicon controlled rectifier 404 which causes the rectifier to assume the ON state whenever pulses from line 420 are present. A potential of 200 VDC is connected through resistor 401 to the anode of silicon controlled rectifier 404 and one terminal of capacitor 403. When silicon controlled rectifier 404 is switched on, the capacitor 403 is coupled on lines 326 across the primary 317 of transformer 316 of FIG. 3. The current through that loop will be a half sine wave pulse since the capacitor 403 and transformer inductance form a resonant circuit and the current cannot reverse through the silicon controlled rectifiers 404. The pulse is then coupled through triggering transformer 316 to the triggering electrode of the flash lamp 313. FIG. 6 shows a circuit similar to the circuit of FIG. 3 where a delta-connected three-phase power source, shown generally at 700, is used to excite the flash lamp. With the diodes 707–710 connected as shown in FIG. 6, the voltage between point 701 and ground is shown by the heavy lines in the waveform shown in FIG. 7. The dotted lines are used for clarity to indicate partially the individual phases of the three-phase source 700. The ripple in each pulse 720 is less than for the circuit shown in FIG. 3 since three overlapping half-sine waves contribute to the pulse rather than two, thus smoothing the center troughs of the pulses. The remainder of the circuit is the same as in FIG. 3.

Figure 8:
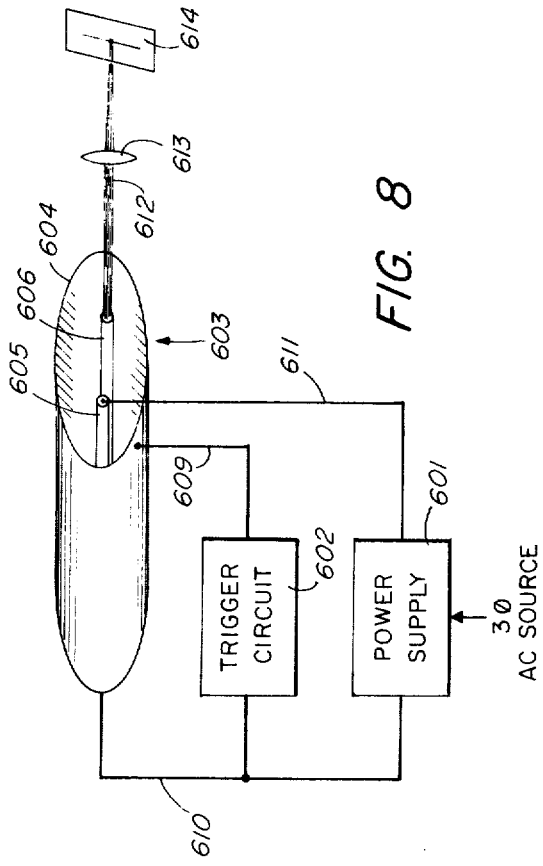
FIG. 8 shows a laser welding system in which the present invention is used to advantage.

FIG. 8 illustrates the use of the present invention in a laser welding application. Here, the flash lamp 605 and laser rod 606 are located each at one of the two foci of the cavity 603 which is elliptical in cross section. The inside surface 604 of cavity 603 is mirrored so that all light emanating from the flash lamp 605 will be focussed onto laser rod 606. The trigger circuit 602 is coupled on line 609 to the cavity 603 which also serves as the external triggering electrode since it is a conducting surface. The power supply 601, the input of which is furnished from the three-phase AC source, is coupled to the cathode of flash tube 605 on line 611 and to the anode on line 610. The pulsed laser beam 612 is focussed through lens 613 onto the material to be welded 614. Many other arrangements could be used for the flash tube and laser rod. For example, the flash tube could be in the form of a helix wound around the laser rod, the combination of which is located at the center of a mirrored cylindrical cavity. Also, two or more such flash tubes could be used. The invention may be used to advantage in laser drilling operations as well as in laser welding applications.

Although preferred embodiments of the invention have been described, numerous modifications and alterations thereto would be apparent to one skilled in the art without departing from the spirit and scope of the present invention.

What is claimed is:
1. In combination:
   a laser active medium;

noncoherent light producing means for pumping said laser active medium to produce a coherent beam of radiation therefrom, said noncoherent light producing means producing said noncoherent light in response to an electrical current flowing through said noncoherent light producing means; and uncontrolled rectifying means, said rectifying means coupling said source of noncoherent light to a source of alternating electrical power, current to said noncoherent light producing means flowing from said source of alternating power through said uncontrolled rectifying means with no substantial energy storing means located therebetween.

2. The combination of claim 1 wherein said means for producing laser light comprises a ruby rod.

3. The combination of claim 1 wherein said means for producing laser light comprises a glass rod doped with neodymium.

4. The combination of claim 1 wherein said means for producing laser light comprises a rod of YAG.

5. The combination of claim 1 wherein said noncoherent light producing means comprises a xenon flash lamp.

6. The combination of claim 1 wherein said flash lamp is in the shape of a rod.

7. The combination of claim 6 wherein said flash lamp and said laser light producing means are at least partially enclosed by a mirrored surface.

8. The combination of claim 6 wherein said flash lamp is in the form of a helix, said laser light producing means being located along the central axis of said helix.

9. The combination of claim 1 wherein said source of alternating electrical power has a plurality of phases.

10. The combination of claim 9 wherein said current is conducted through said noncoherent light producing means only during overlapping half cycles of a portion of said phases of said power source.

11. The combination of claim 10 further comprising means for initiating said current through said noncoherent light producing means at a predetermined phase angle of one of said phases of said source of alternating electrical power.

* * * * *